United States Patent [19]

Erbes

[11] Patent Number: 5,320,467
[45] Date of Patent: Jun. 14, 1994

[54] POSITIVE THREAD START FASTENER

[75] Inventor: John G. Erbes, Mt. View, Calif.

[73] Assignee: General Electric Company, San Jose, Calif.

[21] Appl. No.: 63,824

[22] Filed: May 20, 1993

[51] Int. Cl.[5] .............................................. F16B 25/00
[52] U.S. Cl. ..................................... 411/386; 411/366; 411/411
[58] Field of Search ................ 411/386, 366, 436, 411, 411/423

[56] References Cited

U.S. PATENT DOCUMENTS

| | | | |
|---|---|---|---|
| 447,775 | 3/1891 | Higbee | 411/386 |
| 2,152,681 | 4/1929 | Caminez | 411/423 |
| 2,564,029 | 8/1951 | Peterson | 411/386 X |
| 3,183,531 | 5/1965 | McKewan | 411/411 X |
| 4,755,092 | 7/1988 | Yaniv | 411/554 |
| 4,840,526 | 6/1989 | Bourdonne | 411/263 |
| 4,952,110 | 8/1990 | Avgoustis et al. | 411/386 |
| 4,981,406 | 1/1991 | Weiss et al. | 411/386 |
| 5,073,073 | 12/1991 | Kazino et al. | 411/386 |

Primary Examiner—Rodney M. Lindsey
Attorney, Agent, or Firm—J. S. Beulick

[57] ABSTRACT

A fastener includes an annular body having a screw thread spiraling therearound. The thread has a crest and a pair of front and back flanks extending laterally therefrom, with a start end disposed adjacent to a front end of the body. The start end is flat from the back flank to the front flank and is inclined at an acute back angle relative to a helical axis of the crest for facing the start end toward a back end of the body.

9 Claims, 3 Drawing Sheets

POSITIVE THREAD START FASTENER

The present invention relates generally to remote engagement of fastener components, and, more specifically, to a fastener having improved alignment and engagement features.

BACKGROUND OF THE INVENTION

In the environment of a nuclear reactor such as a boiling water reactor (BWR) for example, components within the reactor pressure vessel are located at a substantial distance below the top thereof and underwater when flooded during maintenance operations. Reactor components are typically assembled and disassembled by remote manipulation through the water to provide maximum shielding and distance from the radioactive environment adjacent the nuclear reactor core.

Threaded fasteners such as bolts and nuts are often used for assembling together components within the reactor. The engagement thereof is relatively difficult since limited access is typically provided in the crowded reactor pressure vessel and due to the flexibility of the remote handling tools which may extend up to about 25 meters below the operator and through the water.

A typical conventional bolt has a thread with a blunt or tapered start or leading edge for engaging with the respective leading edge or start end of the nut. The nut and bolt must be suitably initially axially aligned with each other with the respective threads being disposed closely adjacent to each other within a relatively small percentage of the thread pitch, for example about 5%, to ensure effective mating of the threads as they are rotated into engagement. Other configurations of the bolt front end are also conventionally known for more accurately initially joining together the bolt to the nut without damaging the threads due to misalignment or cross-threading thereof. However, conventional configurations vary in effectiveness and vary in their ability to be assembled using remote robotic or manipulation devices such as those required in the environment of the BWR for engagement at a substantial distance underwater.

SUMMARY OF THE INVENTION

A fastener includes a generally cylindrical body having a screw thread spiraling therearound. The thread has a crest and a pair of front and back flanks extending laterally therefrom, with a start end disposed adjacent to a front end of the body. The start end is flat from the back flank to the front flank and is inclined at an acute back angle relative to a helical axis of the crest for facing the start end toward a back end of the body.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1B:
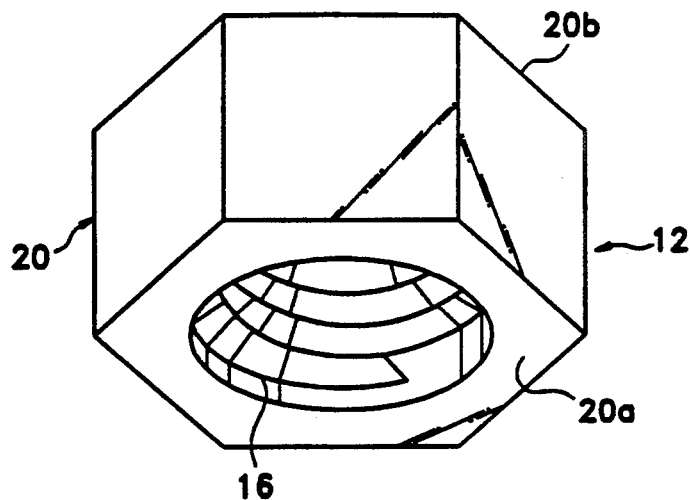
FIG. 1B is a rotated view of the nut illustrated in FIG. 1A.
Figure 1A:
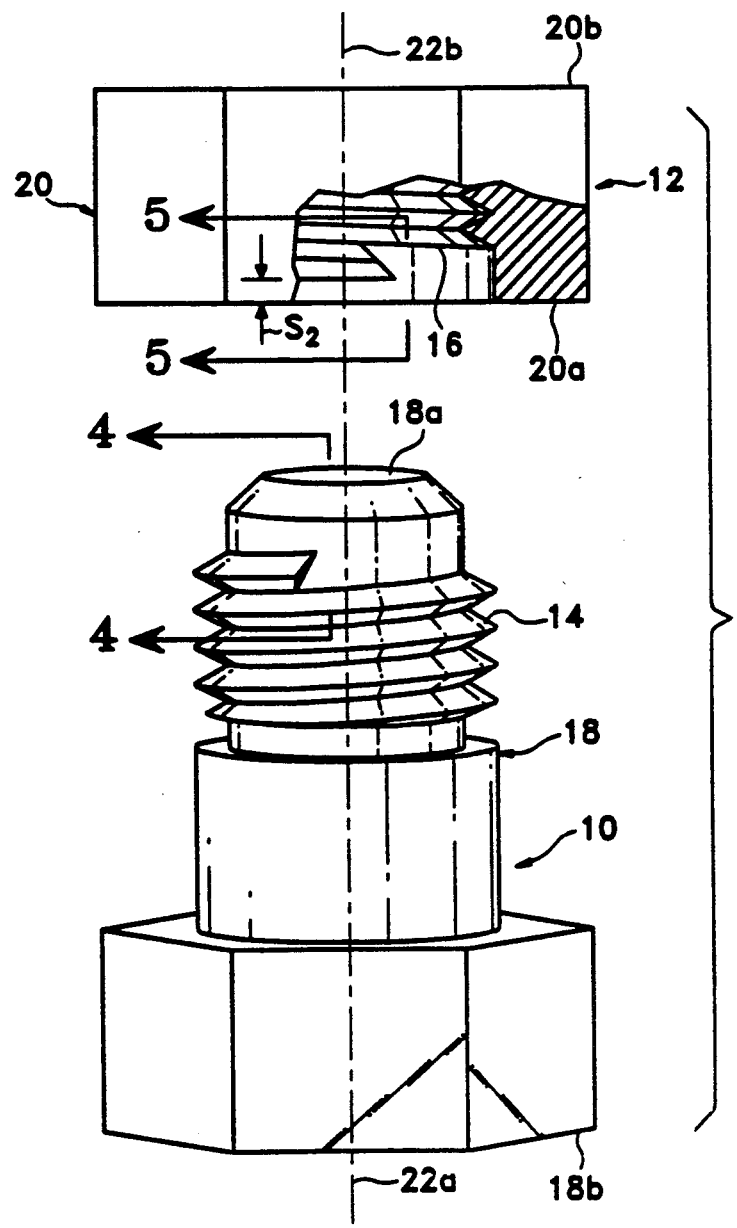
FIG. 1A is an exploded view of a pair of fasteners in the exemplary form of a bolt and nut having complementary screw threads in accordance with one embodiment of the present invention.

Illustrated in FIGS. 1A-1B is a pair of complementary fasteners in the form of a bolt 10 and a nut 12 having respective screw threads 14, 16 configured in accordance with one embodiment of the present invention. The nut 12 is shown in two positions, one in partial cross-section closely adjacent to the bolt 10 (FIG. 1A) and the other in rotated view for showing exemplary features of the screw thread 16 thereof (FIG. 1B).

The bolt 10 has a generally cylindrical body 18 which is solid with a first or front end 18a and an opposite or back end 18b in the exemplary form of a hexagonal bolt head. Correspondingly, the nut 12 includes a body 20 which has a threaded bore and similarly has a first or front end 20a and an opposite second or back end 20b. The bolt 10 has an axial centerline axis 22a, and the nut 12 has an axial centerline axis 22b which are coaxial with each other upon assembly of the bolt 10 and the nut 12 with the respective front ends thereof 18a, 20a first facing each other.

The bolt screw thread 14 is an external thread conventionally spiraling around the body 18 coaxially with the body centerline axis 22a and projecting radially outwardly from the body 18, whereas the nut screw thread 16 is an internal thread conventionally spiraling around the body 20 in the inner surface thereof coaxially with the nut centerline axis 22b and projecting radially inwardly from the nut body 20.

Figure 2:
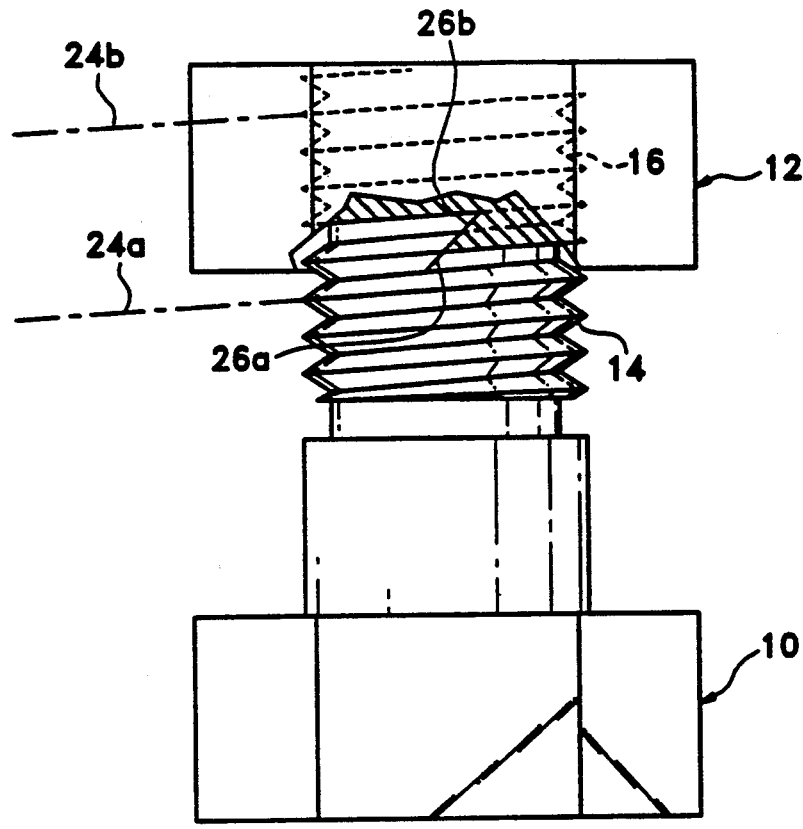
FIG. 2 is an elevational, partly sectional view of the bolt and nut illustrated in FIG. 1 shown in initial starting engagement of respective start ends of the threads thereof.

FIG. 2 illustrates the initial joining together of the bolt 10 and the nut 12 and the initial engagement of the respective screw threads 14, 16 thereof.

Figure 3:
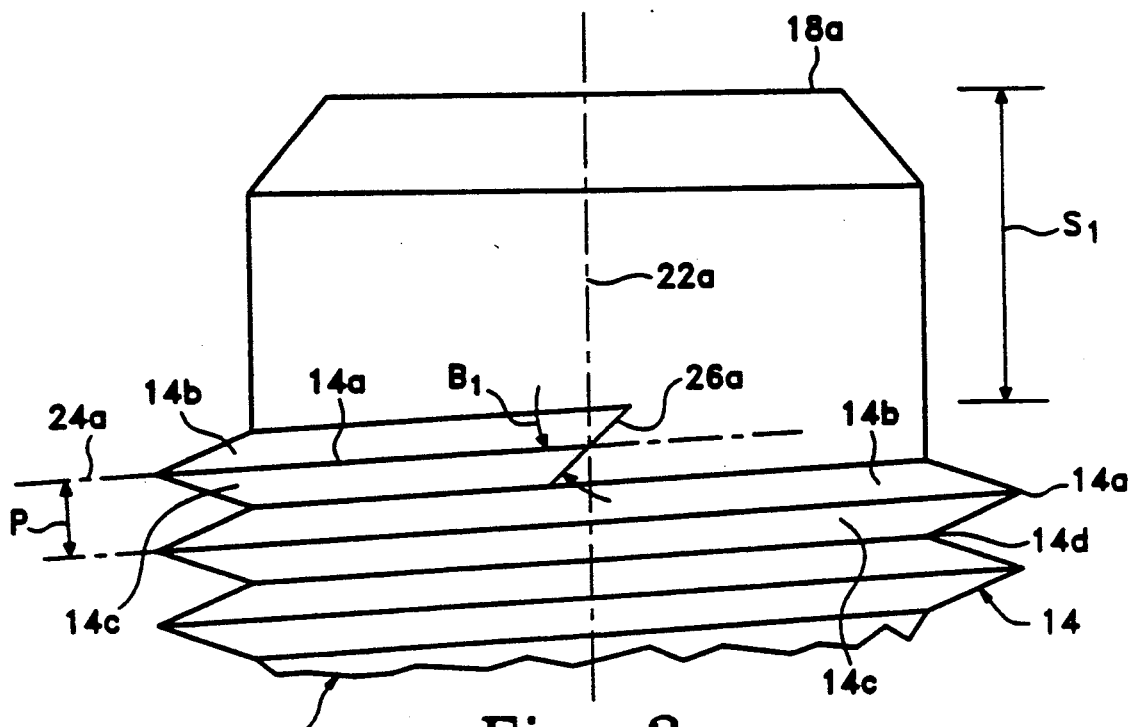
FIG. 3 is an enlarged elevational view of the front end of the bolt illustrated in FIG. 2 showing the start end in more particularity.

FIG. 3 illustrates with more particularity the configuration of the bolt 10 adjacent its front end 18a and the screw thread 14 thereon in accordance with one embodiment of the present invention. The screw thread itself has a crest 14a at its major diameter integrally joining a pair of front and back flanks 14b, 14c, respectively, in a conventional tooth-like sectional configuration with adjoining flanks defining a root 14d at a minor diameter. The configuration may be triangular as shown, or have other conventional shapes such as square or Acme for example. The crest 14a spiral around the bolt body 18 and around the centerline axis 22a and defines a crest longitudinal or helical axis 24a extending circumferentially or helically around the body 18 and obliquely to the body centerline axis 22a and substantially perpendicularly thereto as shown in FIG. 3. As shown, the front flank 14b faces forwardly toward the body front end 18a, with the back flank 14c facing rearwardly away therefrom and toward the body back end 18b (see FIG. 1A).

Figure 4:
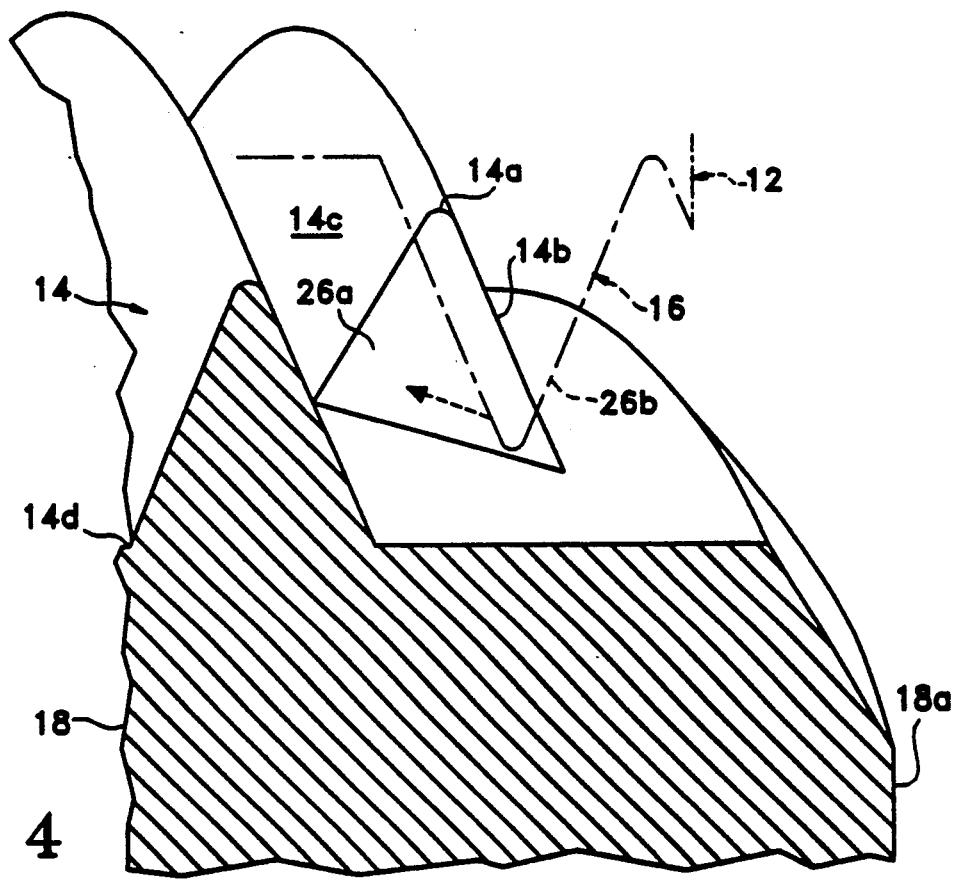
FIG. 4 is a partially sectional view of a portion of the bolt start end illustrated in FIG. 1 and taken along line 4—4.

In order to improve the ability to engage the bolt 10 and the nut 12 underwater using a remote manipulation device, for example, the bolt screw thread 14 in accordance with the present invention as illustrated in FIG. 3 has a start end 26a disposed adjacent to the body front end 18a for first engaging a complementary start end 26b of the mating nut screw thread 16 as shown in FIG. 2. The bolt start end 26a is illustrated in more particularity in FIGS. 3 and 4 and is preferably completely flat from the front flank 14b to the back flank 14c and is chamfered or inclined at an acute back angle $B_1$ relative to the crest helical axis 24a for facing the bolt start end 26a away from the bolt front end 18a and toward the bolt back end 18b. As illustrated in FIGS. 3 and 4, for example, the leading end of the thread is terminated by a beveled start surface projecting radially from the cylindrical body 18 and angled at 45° relative to centerline axis 22a. Also in the preferred embodiment, the back angle $B_1$ is about 45°, although in alternate embodiments it may have suitable values less than 90° to ensure engagement with the respective, and complementary, nut start end 26b.

Referring again to FIG. 3, except for the start end 26a, the bolt screw thread 14 is otherwise conventional with the front and back flanks 14b, 14c forming a substantially symmetrical transverse thread configuration relative to the crest helical axis 24a. However, the chamfered start end 26a ends the symmetry of the screw thread 14 due to the back angle $B_1$ thereof. The bolt screw thread 14 along its front flank 14b at the start end 26a projects circumferentially farther than the back flank 14c at the start end 26a, with the start end 26a thereat being hidden behind the front flank 14b when viewed from the leading end of the bolt.

Figure 5:
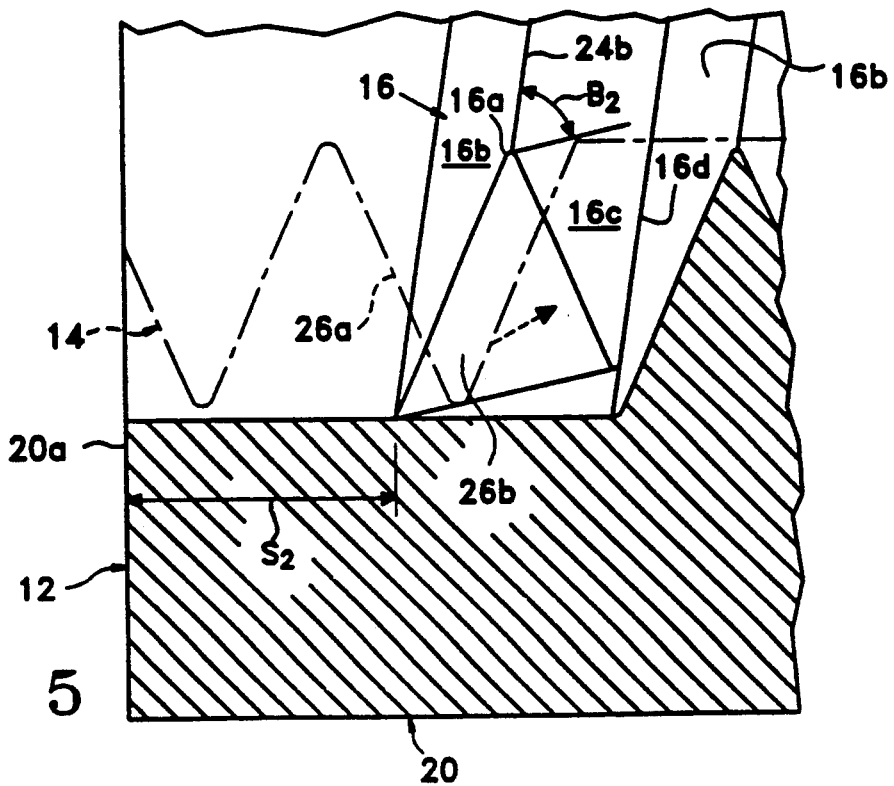
FIG. 5 is a partially sectional view of a portion of the nut start end illustrated in FIG. 1 and taken along line 5—5.

In the preferred embodiment, the nut start end 26b as shown initially in FIG. 2 is complementary in all regards with the bolt start end 26a, with the nut screw thread 16 being an internal thread whereas the bolt screw thread 14 is an external screw thread. FIG. 5 illustrates with more particularity the nut screw thread 16 at its start end 26b. The nut screw thread similarly includes a crest 16a defining a crest helical axis 24b, and a pair of front and back flanks 16b, 16c extending laterally from the crest 16a. The crest 16a is at the minor diameter, whereas adjoining front and back flanks 16b, 16c define the root 16d disposed at the major diameter. The nut start end 26b is similarly flat from the front flank 16b to the back flank 16c and is also chamfered or inclined at an acute back angle $B_2$ relative to the crest helical axis 24b for facing the start end 26b away from the nut front end 20a and toward the back end 20b thereof. The back angle $B_2$ of the nut start end 26b is preferably equal to the back angle $B_1$ of the bolt start end 26a so that the bolt and nut start ends 26a, 26b are parallel to each other upon engagement as illustrated in FIG. 2 for drawing together the bolt 10 and the nut 12 upon threading together thereof.

The complementary start ends 26a, 26b as illustrated in FIG. 2 in effect provide hooks which upon engagement thereof will pull together the mating threads 14, 16 into engagement as the parts are rotated relative to each other. The initial engagement of the cooperating start ends 26a, 26b is illustrated in FIG. 2 in solid line, and is also illustrated in FIGS. 4 and 5 with the cooperating start ends being illustrated in phantom line. Since the respective start ends 26a, 26b are preferably completely flat in configuration they will be effective for pulling together the respective threads 14, 16 when they are axially positioned together anywhere within a tolerance of almost one full thread pitch (see the exemplary conventional thread pitch P illustrated in FIG. 3). This is in contrast to conventional threads which typically require initial engagement of the respective threads thereof within an axial tolerance of only about 5% of the thread pitch.

Accordingly, the cooperating start ends 26a, 26b provide a positive thread start of the engaging threads 14, 16 for more quickly joining together the bolt 10 and the nut 12 without thread damage which is particularly useful where remote installation of the bolt 10 and the nut 12 is required such as in the boiling water reactor environment discussed above using remote manipulation devices at a considerable depth underwater.

In order to improve self-alignment of the bolt 10 into the nut 12, the bolt start end 26a as illustrated in FIG. 3 is preferably spaced back from the bolt front end 18a at a predetermined spacing $S_1$ which therefore leaves an unthreaded piloting portion adjacent the bolt front end 18a which may be used to guide or align the bolt into the nut 12. Similarly, the nut start end 26b as illustrated in FIG. 5 may also be spaced back from the nut front end 20a at a predetermined spacing $S_2$ for improving initial alignment of the components prior to engagement of the respective start ends 26a, 26b.

Referring again to FIG. 3, it will be noted that since the start end 26a is inclined backwardly or rearwardly toward an adjacent spiral of the thread 14, conventional machining of the start end 26a is not practical since a path for the machine cutter and for chip runout is not available. Accordingly, the start end 26a is preferably machined using conventional electrical discharge machining which now makes practical the formation of the start end 26a since the removed metal is consumed during the process. Electrical discharge machining is also used to form the start end 26b in the nut 12 for the same reason. Other processes that consume material such as electrochemical machining (ECM) may also be used.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A fastener comprising first and second fastener elements, said first fastener element having a first centerline axis and an internal helical thread along a first helical axis, said second fastener element having a second centerline axis and an external helical thread along a second helical axis, said internal helical thread having a leading end formed by a first beveled start surface projecting radially toward said first centerline axis and at a first acute angle relative to said first helical axis, said external helical thread having a leading end formed by a second beveled start surface projecting radially from said second centerline axis and at a second acute angle relative to said second helical axis, said first beveled start surface facing toward an adjacent turn of said internal helical thread and said second beveled start surface facing toward an adjacent turn of said external helical thread, said external helical thread being engageable with said internal helical thread to couple said first and second fastener elements to each other with said first and second centerline axes aligned, said first and second acute angles being such that said first and second beveled start surfaces are generally parallel when brought into opposing relationship prior to the start of said threaded engagement.

2. The fastener as defined in claim 1, wherein each of said first and second acute angles is about 45°.

3. The fastener as defined in claim 1, wherein said second beveled start surface is spaced from a leading end of said second fastener element.

4. The fastener as defined in claim 1, wherein said first fastener element is a nut and said second fastener element is a bolt.

5. A fastener element having a centerline axis and a helical thread along a helical axis, said helical thread having a leading end formed by a beveled start surface projecting along a radial line passing through said centerline axis and at an acute angle relative to said helical axis at said leading end, said beveled start surface facing toward an adjacent turn of said helical thread.

6. The fastener element as defined in claim 5, wherein said acute angle is about 45°.

7. The fastener element as defined in claim 5, wherein said beveled start surface is spaced from a leading end of said fastener element.

8. The fastener element as defined in claim 5, wherein said fastener element is a nut and said helical thread is an internal thread.

9. The fastener element as defined in claim 5, wherein said fastener element is a bolt and said helical thread is an external thread.

* * * * *